A. T. DAWSON & G. T. BUCKHAM.
RANGING AND POINTING GEAR OF ORDNANCE.
APPLICATION FILED FEB. 1, 1913.
1,106,083.
Patented Aug. 4, 1914.
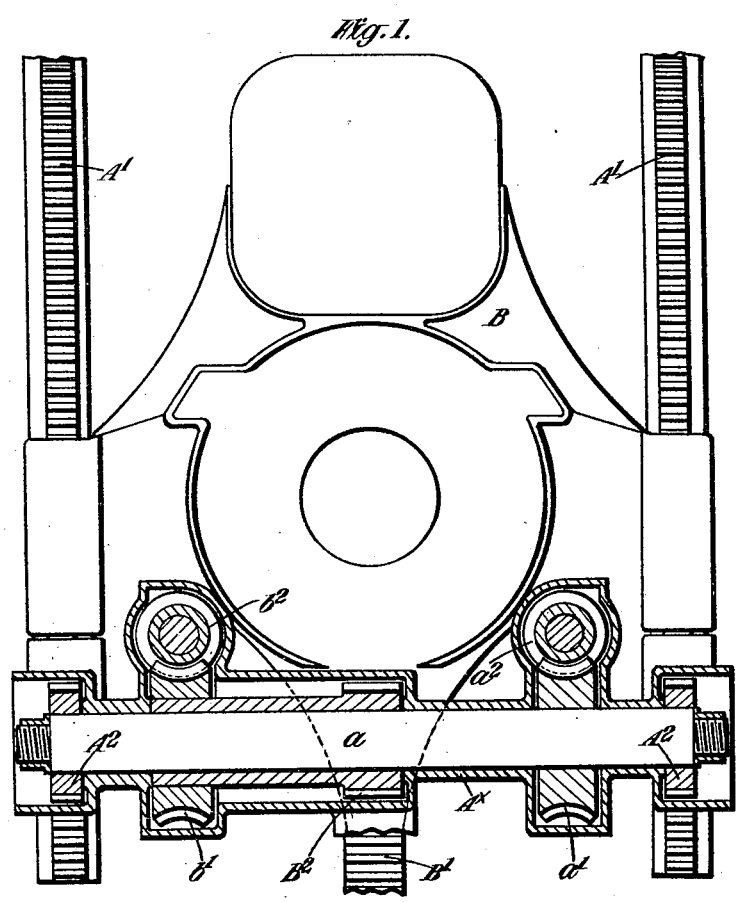

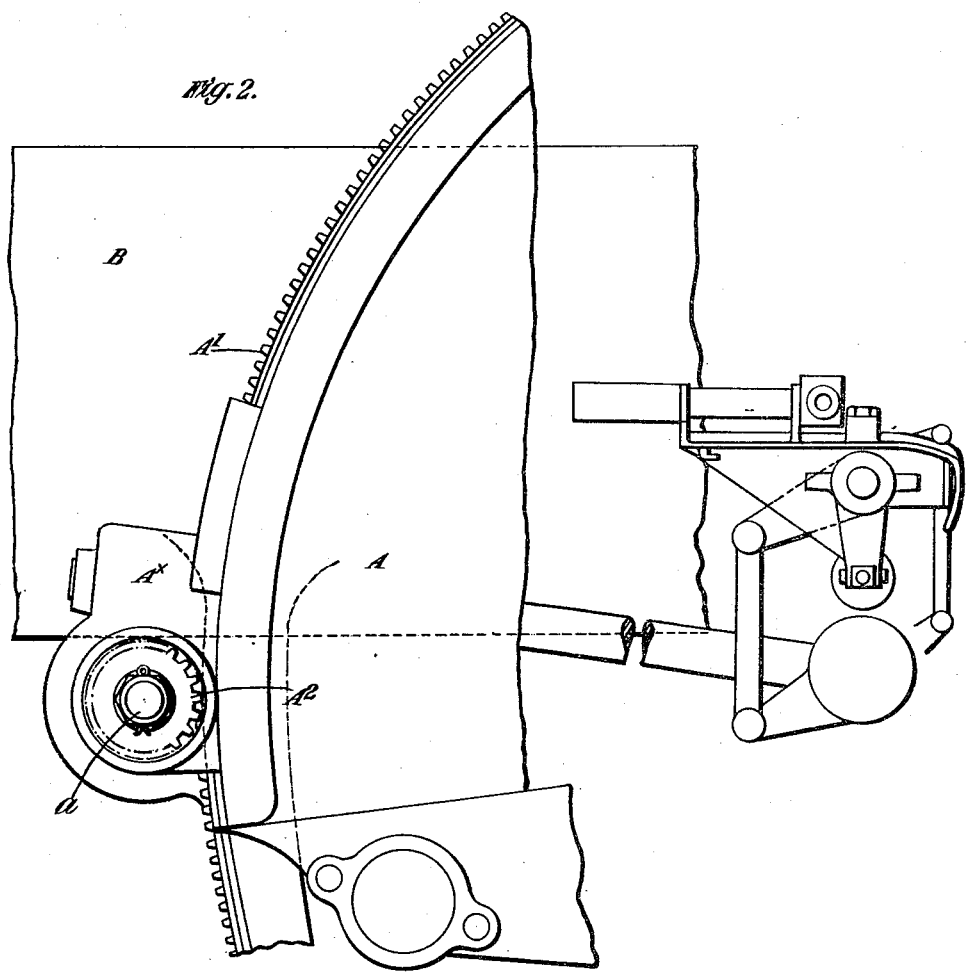

UNITED STATES PATENT OFFICE.

ARTHUR TREVOR DAWSON AND GEORGE THOMAS BUCKHAM, OF WESTMINSTER, ENGLAND, ASSIGNORS TO VICKERS LIMITED, OF WESTMINSTER, ENGLAND.

RANGING AND POINTING GEAR OF ORDNANCE.

1,106,083.  Specification of Letters Patent.  Patented Aug. 4, 1914.

Application filed February 1, 1913. Serial No. 745,595.

*To all whom it may concern:*

Be it known that we, ARTHUR TREVOR DAWSON, knight, and GEORGE THOMAS BUCKHAM, both subjects of the King of Great Britain, residing at Vickers House, Broadway, Westminster, in the county of London, England, have invented certain new and useful Improvements in or Relating to the Ranging and Pointing Gear of Ordnance, of which the following is a specification.

This invention relates to the ranging and pointing gear of ordnance.

According to this invention the ranging and pointing gear comprises two racks, attached respectively to the gun carriage and the cradle, these racks engaging with toothed wheels which are adapted to be actuated independently of each other, but which are so arranged that they will rise and fall together through an arc struck from the trunnions.

In order that the invention may be clearly understood and readily carried into effect, we will describe the same more fully with reference to the accompanying drawings, in which:—

Figure 1 is an end elevation, and Fig. 2 a side elevation of a portion of a gun mounting provided with a constructional form of our improved ranging and pointing gear.

A is the gun carriage, and B the cradle.

A' represents the rack attached to the carriage (which rack is hereinafter referred to as the pointing rack) and $A^2$ is the toothed wheel gearing therewith.

B' represents the rack attached to the cradle (which rack is hereinafter referred to as the ranging rack) and $B^2$ is the toothed wheel gearing therewith. In the example shown the pointing rack A' and the toothed wheel $A^2$ are arranged in duplicate, one on each side of the mounting, and the toothed wheels are in the form of pinions.

The pointing rack A' has slidably mounted thereon a bracket $A^\times$ to which the sighting apparatus is suitably connected as shown in Fig. 2. The said bracket carries a transverse shaft $a$ on which the pinions $A^2$ are mounted; this shaft is provided with a worm wheel $a'$ with which a worm $a^2$ engages. The said shaft carries loosely thereon the pinion $B^2$ that engages with the ranging rack B' on the cradle, and this pinion has attached thereto a worm wheel $b'$ with which a worm $b^2$ engages. As a result of the locking action of the worms $a^2$, $b^2$ and the worm wheels $a'$, $b'$, when either of the worms is actuated by its hand wheel (not shown) the worm wheel and pinion or pinions operated by the other of the worms cannot be angularly displaced. Thus when the worm $a^2$ is actuated, the pinions $A^2$ mounted on the shaft $a$ are angularly displaced and move on the pointing racks A' attached to the carriage, carrying with them the cradle owing to the engagement of the pinion $B^2$ with the ranging rack B'; the sight connected to the bracket $A^\times$ therefore moves with the gun and the pointing operation is thus performed. When the worm $b^2$ appertaining to the worm wheel $b'$ loosely mounted on the shaft $a$ is actuated, the latter, the bracket $A^\times$ and the sight remain stationary and the gun is elevated for range by the coöperation of the pinion $B^2$ with the ranging rack B' on the cradle.

What we claim and desire to secure by Letters Patent of the United States is:—

1. In ranging and pointing gear for ordnance, the combination with the gun carriage and the gun cradle, of a rack attached to the carriage, another rack attached to the cradle, a toothed wheel that gears with the rack on the carriage and forms part of the pointing gear, a toothed wheel that gears with the rack on the cradle and forms part of the ranging gear, said toothed wheels being mounted independently and co-axially, a bracket carrying said toothed wheels and means for slidably mounting said bracket on the rack attached to the carriage.

2. In ranging and pointing gear for ordnance, the combination with the gun carriage and the gun cradle, of a rack attached to the carriage, another rack attached to the cradle, a toothed wheel that gears with the rack on the carriage and forms part of the pointing gear, worm gearing for operating said toothed wheel, a second toothed wheel that gears with the rack on the cradle and forms part of the ranging gear, worm gearing for operating said second toothed wheel, said toothed wheels being mounted independently and co-axially, a bracket carrying said toothed wheels and means for slidably mounting said bracket on the rack attached to the carriage.

3. In ranging and pointing gear for ordnance, the combination with the sighting apparatus, the gun carriage and the gun cradle, of a rack attached to the carriage, another rack attached to the cradle, a toothed wheel that gears with the rack on the carriage and forms part of the pointing gear, a toothed wheel that gears with the rack on the cradle and forms part of the ranging gear, said toothed wheels being mounted independently and co-axially, a bracket carrying said toothed wheels and means for slidably mounting said bracket on the rack attached to the carriage, and means for connecting said bracket to the sighting apparatus.

4. In ranging and pointing gear for ordnance, the combination with the sighting apparatus, the gun carriage and the gun cradle, of a rack attached to the carriage, another rack attached to the cradle, a toothed wheel that gears with the rack on the carriage and forms part of the pointing gear, worm gearing for operating said toothed wheel, a second toothed wheel that gears with the rack on the cradle and forms part of the ranging gear, worm gearing for operating said second toothed wheel, said toothed wheels being mounted independently and co-axially, a bracket carrying said toothed wheels and means for slidably mounting said bracket on the rack attached to the carriage, and means for connecting said bracket to the sighting apparatus.

5. In ranging and pointing gear for ordnance, the combination with the sighting apparatus, the gun carriage and the gun cradle, of a rack attached to the carriage, another rack attached to the cradle, a toothed wheel that gears with the rack on the carriage and forms part of the pointing gear, a spindle carrying said toothed wheel, a toothed wheel that gears with the rack on the cradle and forms part of the ranging gear, a sleeve carrying said last mentioned toothed wheel, and arranged co-axially around the spindle, a bracket in which said spindle and sleeve are mounted, means for slidably mounting said bracket on the rack attached to the carriage, and means for connecting said bracket to the sighting apparatus.

In testimony whereof we affix our signatures in the presence of two witnesses.

ARTHUR TREVOR DAWSON.
GEORGE THOMAS BUCKHAM.

Witnesses:
HENRY KING,
JNO. R. CASWELL.

Copies of this patent may be obtained for five cents each, by addressing the "Commissioner of Patents, Washington, D. C."